(12) United States Patent
Okada

(10) Patent No.: US 7,605,993 B2
(45) Date of Patent: Oct. 20, 2009

(54) WRITE CURRENT BOOSTED HEAD AMPLIFIER

(75) Inventor: Tomohisa Okada, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 484 days.

(21) Appl. No.: 11/638,015

(22) Filed: Dec. 12, 2006

(65) Prior Publication Data

US 2007/0146922 A1   Jun. 28, 2007

(30) Foreign Application Priority Data

Dec. 22, 2005   (JP) ............................. 2005-369772

(51) Int. Cl.
*G11B 5/02* (2006.01)
(52) U.S. Cl. ............................. 360/67; 360/65; 360/68
(58) Field of Classification Search ....................... None
See application file for complete search history.

(56) References Cited

U.S. PATENT DOCUMENTS

| | | | |
|---|---|---|---|
| 5,680,264 A | 10/1997 | Yamagishi | |
| 6,201,653 B1 | 3/2001 | Contreras et al. | |
| 6,307,692 B1 * | 10/2001 | Brown et al. | 360/45 |
| 6,706,426 B1 | 3/2004 | Yamamoto et al. | |
| 6,870,697 B2 * | 3/2005 | Ikekame et al. | 360/46 |
| 2004/0032684 A1 * | 2/2004 | Leighton et al. | 360/68 |
| 2005/0254169 A1 | 11/2005 | Guan et al. | |

FOREIGN PATENT DOCUMENTS

| | | |
|---|---|---|
| EP | 0310373 A | 4/1989 |
| EP | 0490669 A | 6/1992 |
| JP | 2005-078748 | 3/2005 |

OTHER PUBLICATIONS

The Extended European Search Report for Application No. 06024045.4-2210, dated Jun. 20, 2008, 8 pages total.

* cited by examiner

*Primary Examiner*—Jason C Olson
(74) *Attorney, Agent, or Firm*—Townsend and Townsend and Crew LLP; Rambod Nader

(57) ABSTRACT

Embodiments in accordance with the present invention provide a disk drive and a control method in the disk drive which can obtain good recording performance by amplifying the write current according to the recording method and the recording frequency. A HDD in accordance with an embodiment of the present invention comprises a write current supply section and a write head. The write current supply section generates a write signal for recording to a disk and, based on the write current, generates a write current $I_W$. The write head records data to the disk by the write current $I_W$. The write current supply section comprises a write channel to generate a write signal, a write driver to generate a write current from the write signal, a high frequency pattern extracting circuit to extract high frequency pattern parts from the write signal, and a write driver to generate a write current $I_B$ from the extracted high frequency pattern parts. The write currents and are added up and supplied to the write head as the write current whose magnitude is amplified only when the frequency is high.

18 Claims, 16 Drawing Sheets

WRITE CURRENT BOOSTED HEAD AMPLIFIER

CROSS-REFERENCE TO RELATED APPLICATION

The instant nonprovisional patent application claims priority to Japanese Patent Application No. 2005-369772, filed Dec. 22, 2005 and incorporated by reference herein in its entirety for all purposes.

BACKGROUND OF THE INVENTION

The present invention relates to a disk drive and a control method in the disk drive, aimed at providing improved recording characteristics. In particular, the invention relates to a disk drive and a control method of the disk drive, which is suitable for improvement in overwrite characteristics.

As well known, there are a wide variety of data storage devices which use different types of media such as optical disks and magnetic tapes. Hard disk drives (HDD) have widely used and have been one of the indispensable storage devices for today's computer systems. The use of the HDD has been not limited to computers and has proliferated due to the superior characteristics. The HDDs are now used in moving picture recording/reproducing apparatus, car navigation systems, cellular phones, removable memories for digital cameras and the like.

The HDD comprises a magnetic disk to record data thereon, and a head which performs data writing into and data reading from the magnetic disk. The head has a head element section which is a thin film element, and a slider having the head element section disposed thereon. The head element section has a write element section and a read element section. The write element section converts an electrical signal to a magnetic field according to write data for the magnetic disk, and the read element section converts a magnetic field generated from the magnetic disk to an electrical signal. Typically, the write element section and the read element section are formed on a thin film device in an integration fashion.

In general, the write element section is constituted by using an inductive thin film element. A head amp circuit changes the polarity of a write current which flows in the thin film element based on binary write data. By increasing, at a high speed, a switching frequency for switching the polarity of the write current which flows in the thin film element, it is possible to increase the density of binary data recorded on the disk. Since the thin film element has a coil structure, however, the write current (effective current) flowing in the thin film element is more impeded as the frequency is increased. Thus, a higher power supply voltage is needed to obtain higher recording density in the magnetic disk drive.

To obtain a higher power supply voltage in a drive, an arrangement in which a booster is disposed in a disk drive has been proposed, for example, in Patent Document 1 Japanese Patent Laid-Open No. 2005-78748. According to the technique disclosed in Patent Document 1, a voltage boosted by a booster is supplied only to a write current driver of a head amp circuit. The purposes of the technique are to prevent decrease of the rising speed of a write current, ensure good recording characteristics even for high density recording, and minimize an increase in power consumption, even if a power supply voltage of the disk storage device is low.

The overwrite characteristics are improved by increasing a write current. This can obtain good recording characteristics. Generally, with respect to writing data to the disk in the HDD, previously written data is overwritten with new data. The overwrite characteristics are an important index of the recording characteristics of the HDD. The overwrite characteristics depend on how much the original data that is overwritten is completely erased. That is, the overwrite characteristics are defined as the attenuation rate of a low frequency signal.

The overwrite characteristics may be judged according to whether a signal can properly be read out from the disk after the disk is overwritten with the signal under poor conditions. For example, in the case of a in-plane (horizontal) magnetic recording system, if a signal written to the disk is composed of patterns 1L through 9L, data composed of the longest pattern 9L is first written by a write head. This pattern 9L is read out by a read head. The read head outputs a read signal having a single peak at a low frequency $f_{9L}$ corresponding to the pattern 9L. Then, the pattern L1 is overwritten in a disk area, in which the pattern 9L is written, at a high frequency f2 corresponding to the shortest pattern 1L. The thus written pattern 1L is read out by the read head. This read signal includes a peak at the previous low recording frequency $f_{9L}$ (residual components) as well as a peak at the high frequency $f_{1L}$.

If the residual components of the previously written data signal are significant, unexpected signal components are included in a read signal, resulting in poor overwrite characteristics. That is, poor overwrite characteristics make it difficult to correctly recognize a read signal, making data rewriting impossible.

In the case of the in-plane magnetic recording system, as the switching frequency for switching the polarity of the write current flowing in the thin film element is increased, solitary waves increasingly interfere with each other. This impedes the effective write current and therefore causes deterioration in the overwrite characteristics. Further, if the write current value is lower than an assumed value due to a variation of the write head itself, the overwrite characteristics deteriorate particularly when data with a short pattern length is written in a high frequency range that is close to the specified operating frequency range of the head amp. The overwrite characteristics can be improved by increasing the write current as described in Patent Document 1.

Further, in the case of the in-plane magnetic recording system, high frequency recording poses a problem that the magnetization of a recording layer on the disk can not be saturated sufficiently due to the reduced effective write current. To avoid this or generate a head recording magnetic field sufficient to saturate the magnetization of the recording layer on the disk, the write current must be increased by using such a technique as described in Japanese Patent Laid-Open No. 2005-78748 (Patent Document 1).

To sufficiently improve the overwrite characteristics or obtain a necessary head recording magnetic field, however, increasing the write current may cause adjacent track interference (ATI). In this case, since the recording magnetic field from the write head acts not only on the target track but also on its adjacent tracks, the recording characteristics may deteriorate.

Embodiments in accordance with the present invention address the above-referenced issues.

BRIEF SUMMARY OF THE INVENTION

Embodiments in accordance with the present invention provide a disk drive and a control method in the disk drive which can obtain good recording performance by amplifying the write current according to the recording method and the recording frequency. Referencing FIG. 13, a HDD in accordance with an embodiment of the present invention comprises a write current supply section and a write head 112a. The write current supply section generates a write signal for recording to a disk and, based on the write current, generates a write current $I_W$. The write head 112a records data to the disk by the write current $I_W$. The write current supply section comprises a write channel 121 to generate a write signal V1, a write driver A 202 to generate a write current $I_A$ from the write signal V1, a high frequency pattern extracting circuit 201 to extract high frequency pattern parts from the write signal, and a write driver B 203 to generate a write current $I_B$ from the extracted high frequency pattern parts. The write currents $I_A$ and $I_B$ are added up and supplied to the write head 112a as the write current $I_W$ whose magnitude is amplified only when the frequency is high.

DETAILED DESCRIPTION OF THE INVENTION

Figure 1:
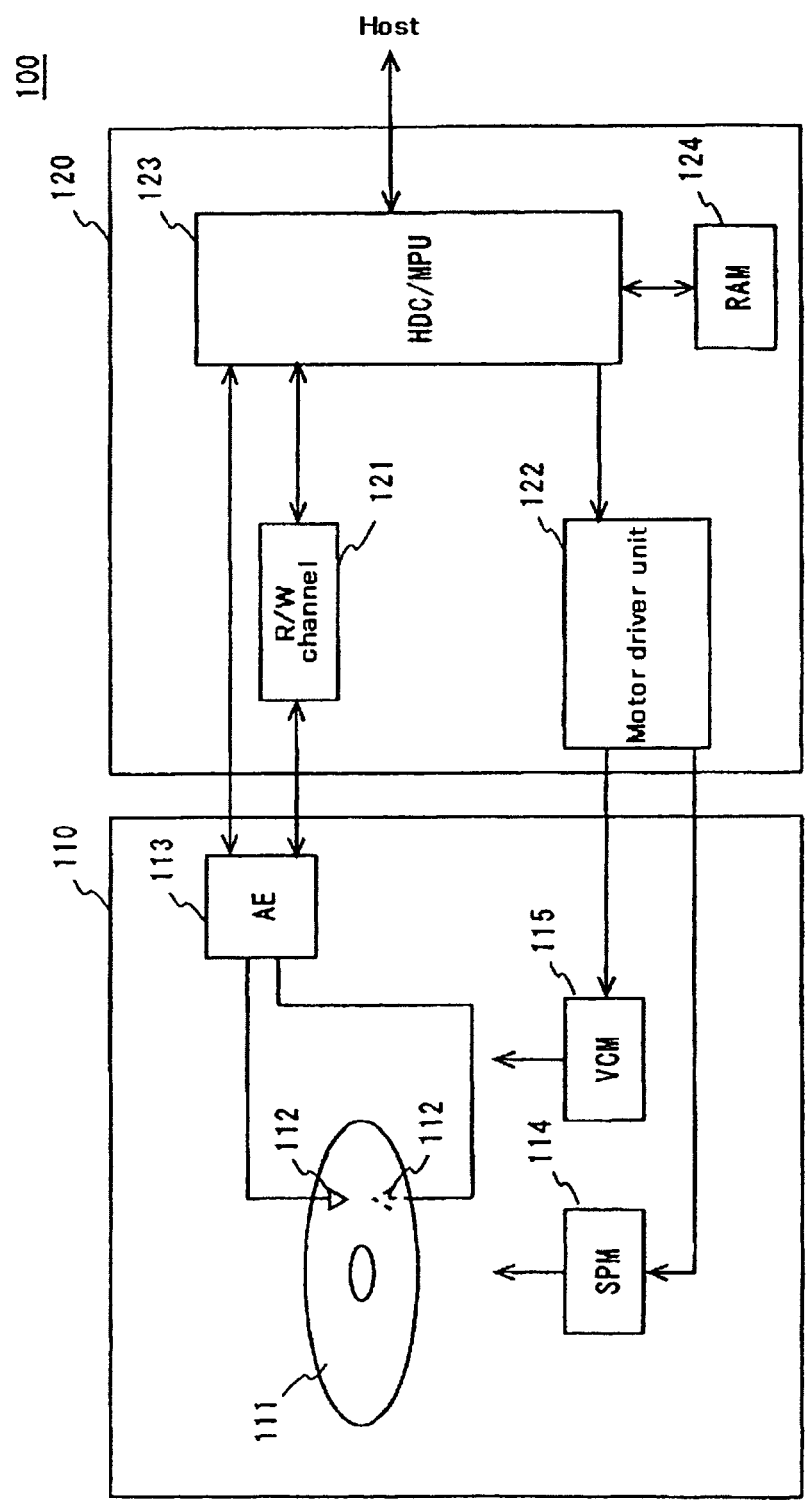
FIG. 1 is a block diagram showing a HDD according to an embodiment of the present invention.

Embodiments in accordance with the present invention provide a disk drive and a control method in the disk drive which can obtain good recording characteristics since the write current is amplified according to the recording method or the recording frequency.

It is an object of embodiments in accordance with the present invention to provide a disk drive and a control method in the disk drive which can obtain good recording characteristics by ensuring good overwrite characteristics at any recording frequency while reducing influences caused by the ATI. It is another object of the present invention to provide a disk drive and a control method in the disk drive which can ensure high reliability by supplying a sufficiently high current to the head even at a recording frequency which impedes the current in the head while reducing influences caused by the ATI.

To achieve the above-mentioned objects, embodiments in accordance with the present invention provide a disk drive comprising: a write current supply section for generating a write signal to be recorded to a disk and generating a write current based on the write signal; and a write head for recording data to the disk based on the write current. The write current supply section generates the write current in a range of frequencies that depend on data lengths and supplies to the write head the write current of which only the part in a specific frequency range of the write signal is amplified.

According to an embodiment of the present invention, the current supply section generates the write current in a range of frequencies that depend on the data lengths. When the current supply section generates the write current of which only the part in the specific frequency range of the write signal is amplified and supplies it to the write head, it is possible to improve the recording characteristics while suppressing influences due to the ATI.

The above-mentioned disk drive may be such that the write current supply section comprises: a write channel for generating the write signal to be recorded to the disk; a first write driver for generating a first write current based on the write signal generated by the write channel; a specific frequency signal part extracting circuit for extracting a signal in the specific frequency range from the write signal generated by the write channel; and a second write driver for generating a second write current based on the signal in the specific frequency range extracted by the specific frequency signal part extracting circuit. The write head records data to the disk based on the first write current and the second current. Thus, the second write current is separately generated for amplification from part of the write signal in the specific frequency range necessary for amplification. By adding the second write current to the first write current, it is possible to supply the write current of which only the part in a specific frequency range of the write signal is amplified.

The write current supply section may also be such that it comprises: a write channel for generating the write signal to be recorded to the disk; a specific frequency signal part detecting circuit detecting a signal in the specific frequency range from the write signal generated by the write channel; and a write driver for generating the write current of which only the part in a specific frequency range of the write signal is amplified based on the write signal and a result detected by the specific frequency signal part detecting circuit. That is, the write signal in the specific frequency range is detected. Based on this detected result, it may be possible to generate the write current of which only the part in the specific frequency range of the write signal is amplified.

The write current supply section may also be such that it comprises: a write channel for generating the write signal to be recorded to the disk; a write driver for generating a first write current based on the write signal generated by the write channel; and a specific frequency signal part amplifying circuit for generating a second write current by amplifying the first write current in a specific frequency range of the write signal, which is generated by the write driver. The write head records data to the disk based on the second write current. That is, after the write current is once generated from the write signal, only the part of the write current in the specific frequency range that needs to be amplified is amplified before supplied to the write head.

The above-mentioned specific frequency range may be set so as to include the frequencies to record data with the shortest length to the disk. For the in-plane recording system, this makes it possible to provide good recording characteristics for data with the shortest length which tends to cause the overwrite characteristics to deteriorate.

The write current supply section can amplify the write current in a high frequency range within a range of frequencies that depend on the data lengths. For the in-plane recording system, the effective current flowing in the write head which is in the high frequency range tends to decrease. By amplifying the write current in the high frequency range, it is possible to always generate a sufficiently high magnetic field and therefore improve the overwrite characteristics.

Further, the specific frequency range may be set so as to include the frequencies to record the data with longest length to the disk. For the perpendicular recording system, this makes it possible to provide good recording characteristics for the data with largest length which are likely to cause the overwrite characteristics to deteriorate.

In this case, the write current supply section amplifies the write current in a low frequency range within frequencies that depend on the data lengths. For the perpendicular recording system, the overwrite characteristics is likely to deteriorate when the frequency is low. By amplifying the write current in the low frequency range, it is possible to always generate a sufficiently high magnetic field and therefore ensure good overwrite characteristics.

Embodiments in accordance with the present invention also provides a disk drive comprising: a write current supply section for generating a write signal to be recorded to a disk and generating a write current based on the write signal; and a perpendicular recording write head for recording data to the disk based on the write current. For the write current generated in the current supply section and supplied to the perpendicular recording write head, only write current in a low frequency range within frequencies that depend on the data lengths.

According to an embodiment of the present invention, in the perpendicular recording system, a sufficient magnetic field from the write head can be generated by amplifying only the write current in a low frequency range that tends to cause the overwrite characteristics to deteriorate. Thus, the overwrite characteristics is kept good over the whole frequency range. Influences due to the ATI can be minimized since the write current is not amplified unless necessary.

The present invention also provides a control method for a disk drive comprising: a write current supply section for generating a write signal to be recorded to a disk and generating a write current based on the write signal; and a write head for recording data to the disk based on the write current. The control method comprises the steps of: generating the write current of which only the part in the specific frequency range of the write signal is amplified; and making the write head record data to the disk based on the write current.

According to the present invention, it is possible to improve the recording characteristics while suppressing influences due to the ATI since only the write current in the specific frequency range of the write signal is amplified.

As mentioned above, to improve the overwrite characteristics or to sufficiently ensure the recording magnetic field from the head, which decreases depending on the switching frequency, it is effective to increase the write current. However, increasing the write current poses the problem that the recording characteristics may deteriorate due to the ATI. As a result of earnest study aimed at solving this problem, the inventors of the present invention found that it is possible to ensure good overwrite characteristics while minimizing influences due to the ATI by increasing only the write current in a specific switching frequency range in which the overwrite characteristics deteriorates or the recording magnetic field from the head decreases.

Specifically, in the case of the in-plane recording system, the write current in a high frequency range is amplified. In the case of a perpendicular recording system, the write current in a low frequency range is amplified. If the write current is increased in the frequency range that causes the overwrite characteristics to deteriorate, good overwrite characteristics are ensured without deteriorating the recording characteristics due to the ATI. In addition, amplifying the write current over the whole frequency range, as described in Japanese Patent Laid-Open No. 2005-78748 (Patent Document 1), prevents the recording characteristics from deteriorating due to the ATI. In the case of the in-plane recording system, a sufficient recording magnetic field from the write head may not be obtained when the effective write current decreases. Amplifying the write current makes it possible for the write head to generate a magnetic field sufficient to saturate the magnetization of the recording layer on the disk.

With reference to the drawings, the following will describe a detailed embodiment of the present invention. In this embodiment, a specific frequency range of the write current is detected to amplify the write current in the frequency range, and the write current is controlled to be increased. It is assumed in the following description that high frequency patterns are amplified for the in-plane recording system. As described later, the same effect can also be obtained in the perpendicular recording system in which the write current in a low frequency range is amplified.

The following provides a description of the general configuration of the hard disk drive (HDD) according to an embodiment of the present invention. FIG. 1 is a block diagram showing the HDD according to the embodiment of the present invention. As shown in FIG. 1, the HDD 100 has a magnetic disk 111, a head 112, an arm electronics (AE) 113, a spindle motor (SPM) 114, and a voice coil motor (VCM) 115 in an enclosure 110. In addition, the HDD 100 has a circuit board 120 fixed to the outside of the enclosure 110. The circuit board 120 is provided with a read/write channel (R/W channel) 121, a motor driver unit 122, a hard disk controller (HDC)/MPU integrated circuit (hereinafter HDC/MPU) 123 and a RAM 124 as an example of memory.

Write data from an external host is received by the HDC/MPU 123 and written to the magnetic disk 111 by the head 112 via the R/W channel 121 and the AE 113. In addition, the write data stored on the magnetic disk 111 is read out by the head 112 and output to the external host from the HDC/MPU 123 via the AE 113 and the R/W channel 121.

Each component of the HDD is described. The magnetic disk 111 is fixed to the rotational axis of the SPM 114. The SPM 114 is driven by the motor driver unit 122 to rotate the magnetic disk 111 at a predetermined speed. The magnetic disk 111 has data recording surfaces on both sides thereof. Heads 112 associated with each recording surface are provided. Each head 112 is fixed to a slider (not shown in the figure) that is fixed to a carriage (not shown in the figure). The carriage is fixed to the VCM 115, and VCM 115 pivots the slider and the head.

Typically, the head 112 has a write head and a read head which are formed integrally thereon. The write head converts an electrical signal to a magnetic field according to write data written into the magnetic disk 111. The read head converts a magnetic field from the magnetic disk 111 to an electrical signal. It should be noted that one or more magnetic disks 111 may be contained and recording surface(s) may be formed on either one side or both sides of the magnetic disk 111.

Each circuit section is described below. The AE 113 chooses one head 112 from the plural heads 112 for data access. A read signal read out by the selected head 112 is amplified in the AE 13 by a certain gain and sent to the R/W channel 121. In addition, the write signal from the R/W channel 121 is sent by the AE 13 to the selected head 112. Particularly in the present embodiment, high frequency patterns to be amplified are detected from the write signal sent from the R/W channel. The write current supplied to the write head is generated by exclusively amplifying the detected high frequency patterns of the write signal by using a write driver contained in the AF 113. This makes it possible to improve the overwrite characteristics while suppressing influences due to the ATI. The details are described below.

The R/W channel 121 executes write processing for data obtained from the host. In the write processing, the R/W channel 121 code-modulates the write data supplied from the HDC/MPU 123 and further converts the code-modulated write data to the write signal (current) for supplying it to the AE 113. In addition, when data is supplied to the host, the R/W channel 121 executes read processing.

In the read processing, the R/W channel 121 amplifies the read signal supplied from the AE 113 to a certain amplitude level, extracts data from the read signal obtained and decodes the data. The read data includes user data and servo data. The decoded read data is supplied to the HDC/MPU 123.

The HDC/MPU 123 is a single chip circuit where a MPU and a HDC are integrated. The MPU operates according to microcodes loaded into the RAM 124, executes general control of the HDD 100, including positioning control for the heads 112, interface control, and defect management, and processing required for data processing. When the HDD 100 is started, not only microcodes which are to run on the MPU but also data required for control and data processing are loaded into the RAM 124 from the magnetic disk 111 or a ROM (not shown in the figure).

The HDC/MPU 123 has an interface function provided between the host and the HDC/MPU 123 to receive user data and commands such as read and write commands sent from the host. The user data received is transferred to the R/W channel 121. In addition, the HDC/MPU 123 obtains read data from the magnetic disk via the R/W channel 121 and transmits the read data to the host 51. Further, the HDC/MPU 123 executes ECC (error correcting code) processing on the user data obtained from the host or read out from the magnetic disk 111. The HDD 1 of this embodiment sends and receives data (including commands, user data and control data) to and from the host 25 through serial or parallel communication.

Data read out by the R/W channel 121 includes servo data as well as user data. The HDC/MPU 123 performs positioning control of the heads 112 by using the servo data. The HDC/MPU 123 outputs control data to the motor driver unit 122. The motor driver unit 122 supplies a drive current to the VCM 115 according to the control signal. In addition, the HDC/MPU 123 controls data read/write processing by using the servo data.

A plurality of concentric tracks, each having a certain width in the radial direction, are formed on recording surface of the magnetic disk 111. Depending on the positions in the radial direction of the magnetic disk 111, these tracks are grouped into plural zones. For each zone, the number of sectors per track is set. It is possible to raise the recording density by setting a recording frequency for each zone.

Figure 2:
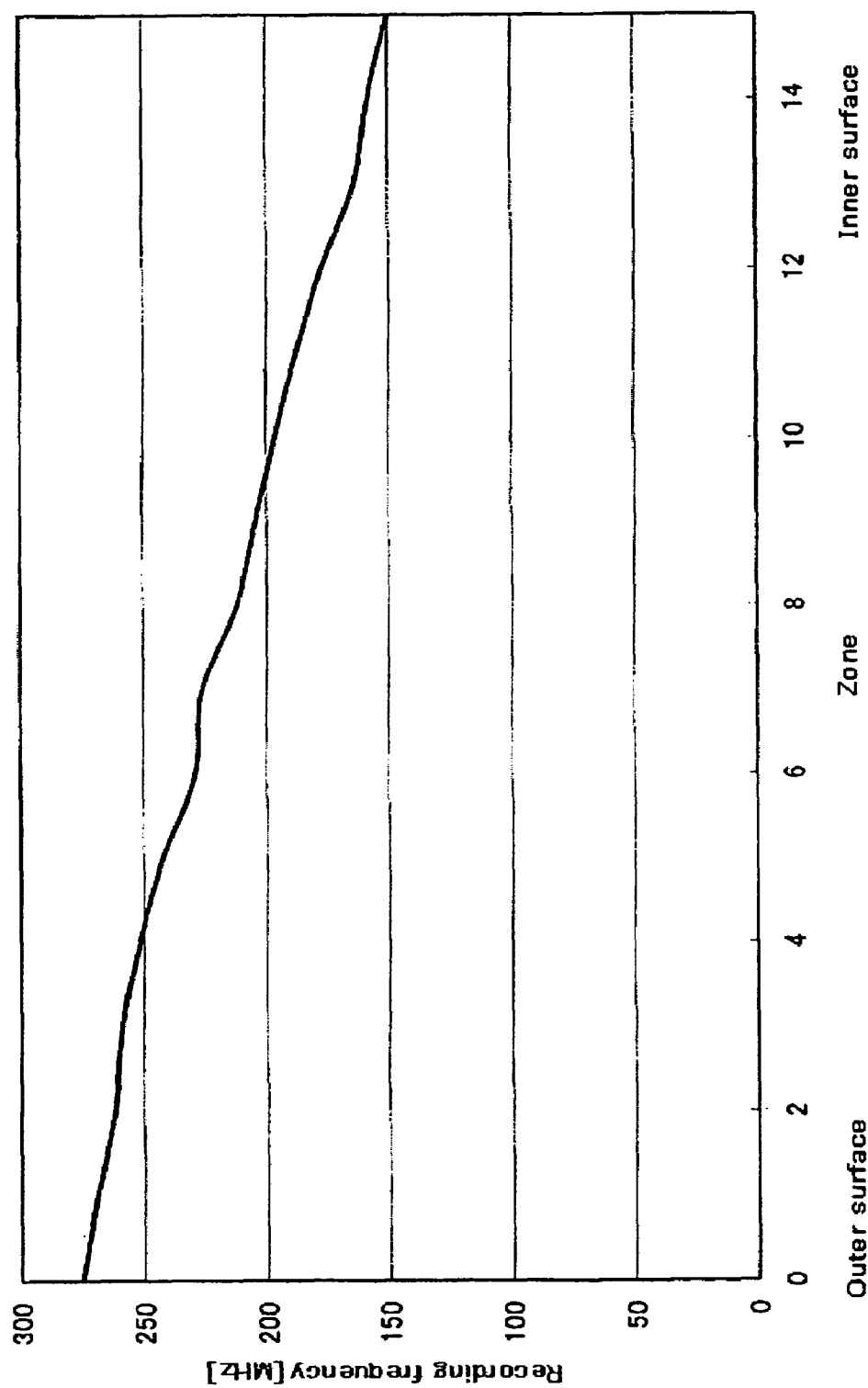
FIG. 2 is a graph showing an example of the relationship between zones and the corresponding frequencies in an in-plane recording system.

FIG. 2 shows an example of the relationship between the zones and the corresponding frequencies. In the example of FIG. 2, sixteen zones are set on the disk 111. The frequency is increased toward the outermost zone. In the example of FIG. 2, frequencies higher than 250 MHz are used on the outer zones than zone 4.

Figure 3:
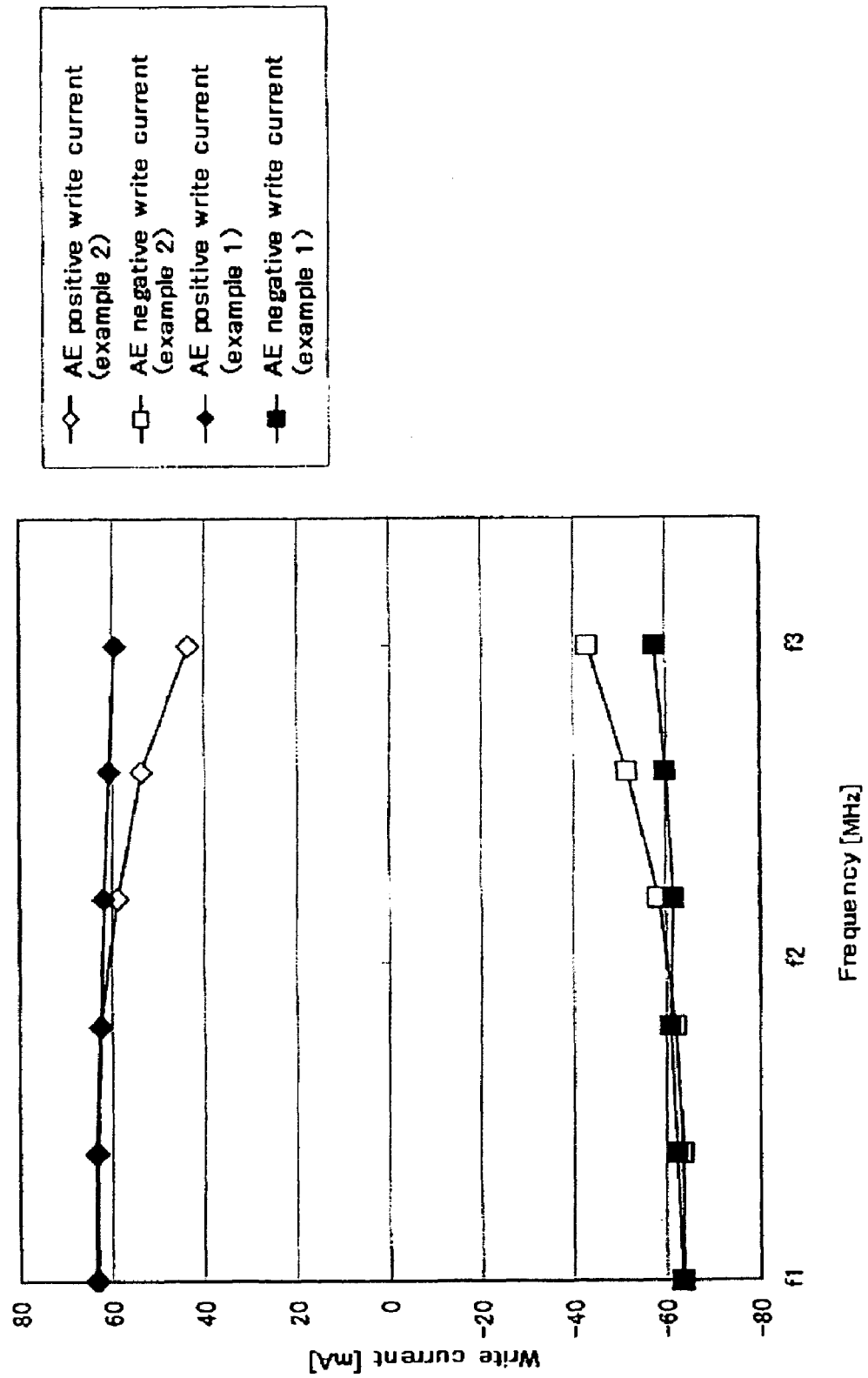
FIG. 3 is a graph showing the relationship between the values of a write current and the corresponding frequencies in the in-plane recording system.

FIG. 3 is a graph showing how the amplification of the write current depends on the frequency. In FIG. 3, examples 1 and 2 show curves of the write currents of the two heads. The AE controls the direction of the current which flows in the write head by supplying two types of signals from the R/W channel, the signals having different polarity. When the current flows in the write head, a magnetic field caused by this current generates a magnetic flux in the magnetic poles. Due to a leakage magnetic field (recording magnetic field from the head) from the magnetic gap faced to the disk, the recording magnetic layer on the disk is magnetized in a certain direction based on the signals. This makes it possible to write data to the disk 111. In the present embodiment, the direction of a current flowing in the write head determines either a positive write current or a negative write current.

At any recording frequency, the HDD is required not only to provide good overwrite characteristics but also to generate a recording magnetic field enough to saturate the magnetization of the magnetic layer on the disk. In the example shown in FIG. 2, it is assumed that a specified frequency ranges from 100 to 300 MHz. The write current is required not to fall below a certain current value (hereinafter denoted as the current value I0). The current value I0 is the minimum value to generate a magnetic field from the write head enough high to provide good recording characteristics. In the case of example 1 shown in FIG. 3, if the write current value I0 is ±60 mA, there is no problem when the specified frequency ranges from f1 to f3. Likewise, in the case of example 2, there is no problem when the specified frequency ranges from f1 to f2.

To improve the overwrite characteristics in the high frequency range, it is preferable to increase the write current. From the view point of the ATI, however, the write current must be reduced as low as possible. Accordingly, in the present embodiment, only the write current in the high frequency range that deteriorates the overwrite characteristics are amplified. If the patterns to be recorded vary in length from 1L to 9L, there are many cases where the overwrite characteristics deteriorates caused by a frequency range used when the shortest pattern length 1L or a short pattern length such as the second shortest pattern length 2L is written. It is therefore assumed in the following description that the high frequency range to be amplified include the frequencies to record 1L and 2L patterns. A current value to be amplified is denoted as ΔI. Only the frequency range to record 1L pattern may be targeted for amplitude. The frequency targeted for amplitude may be set if necessary.

Figure 4:
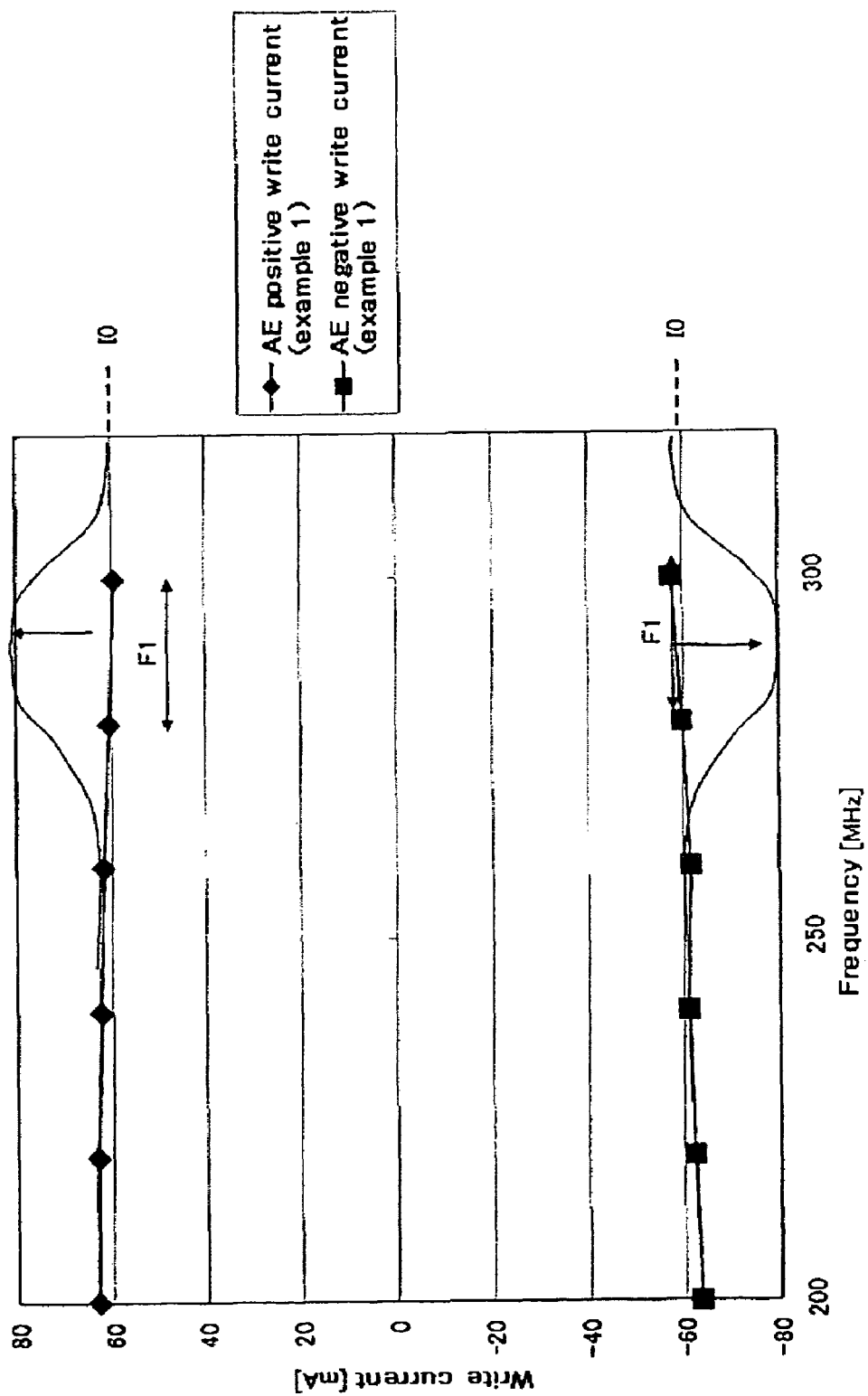
FIG. 4 is a graph showing an example of how the write current is amplified in the in-plane recording system.
Figure 5:
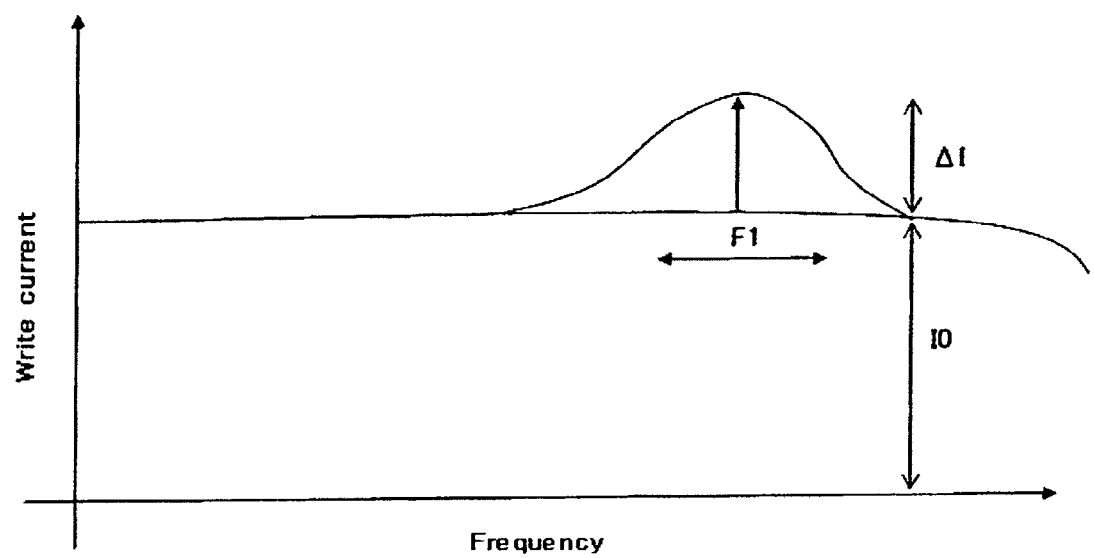
FIG. 5 is a schematic diagram for explaining the example of amplifying the write current in the in-plane recording system.

In FIGS. 4 and 5, the write current is amplified only in the high frequency range. If the frequency range to record 1L and 2L patterns is F1 which ranges from 260 to 280 MHz as shown in FIGS. 4 and 5, the write current is amplified only in the frequency range F1. That is, the write current is increased to I0+ΔI only when the frequency is in the frequency range F1. At the other frequencies, the value of the write current remains at a value of I0. This can improve the overwrite characteristics in the high frequency range corresponding to data with a short pattern length, while minimizing deterioration of the recording characteristics due to the ATI.

Amplifying the write current in the high frequency range provides another effect as described below. As mentioned above, the write current in the write head (thin film element) is more impeded as the frequency increases. Therefore, the write current may falls below I0 as shown in example 2 of FIG. 2 where the write current is lower than I0 when the frequency is higher than f2. If the specified operating frequency range of the head amp is in the frequency range of f1 to f2, there is no problem as mentioned above. However, if the specified operating frequency range includes the frequency range which is higher than f2 at which the write current begins to decrease, it is not always possible for the write head to generate a magnetic field enough high to perform normal recording. At a frequency range within the specified frequency range, for example, if the write current is lower than I0 at which a sufficient magnetic field can be generated, the write head is considered defective. In this case, an assembly containing the write head must be replaced.

Figure 6:
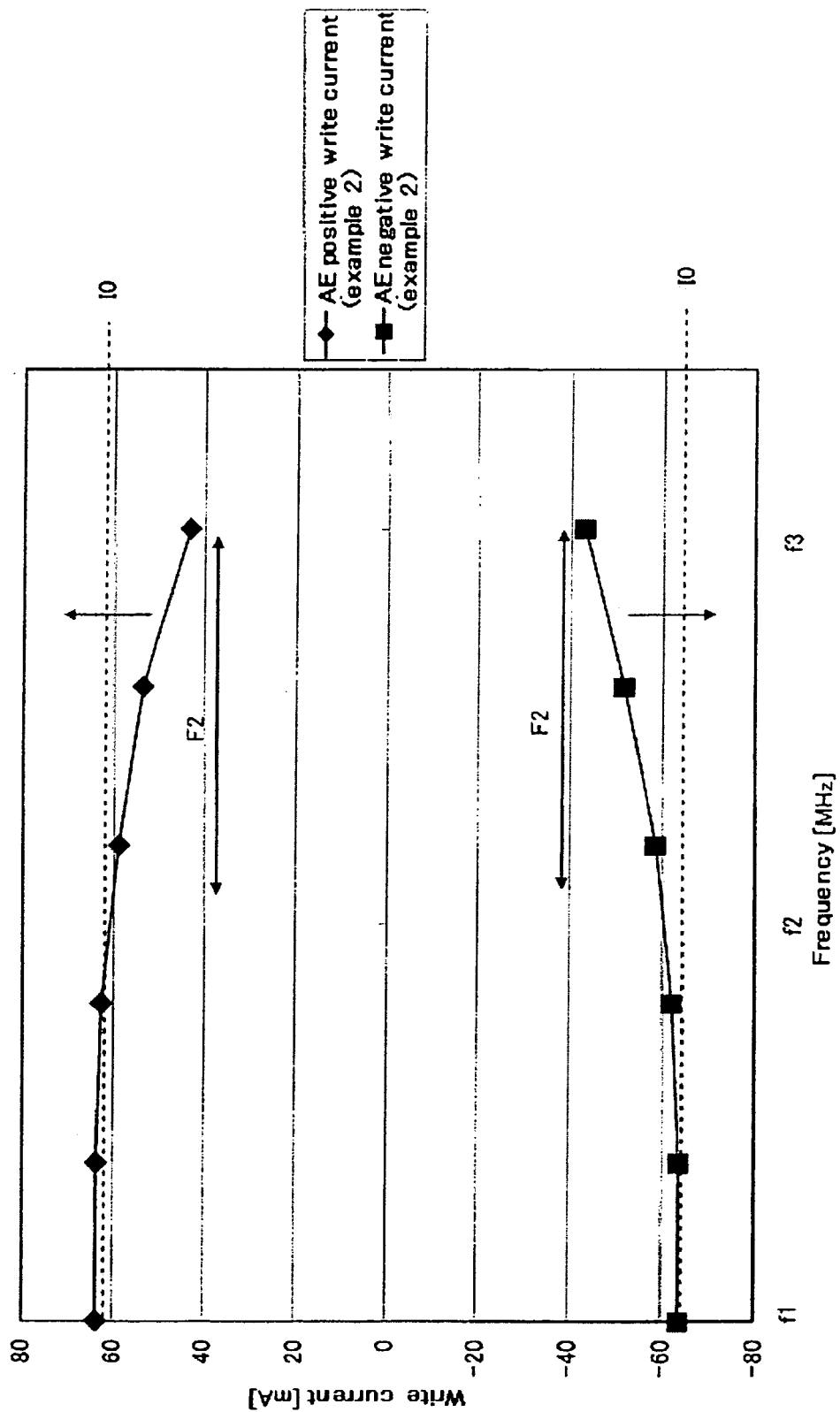
FIG. 6 is a graph showing a second example of how the write current is amplified in the in-plane recording system.
Figure 7:
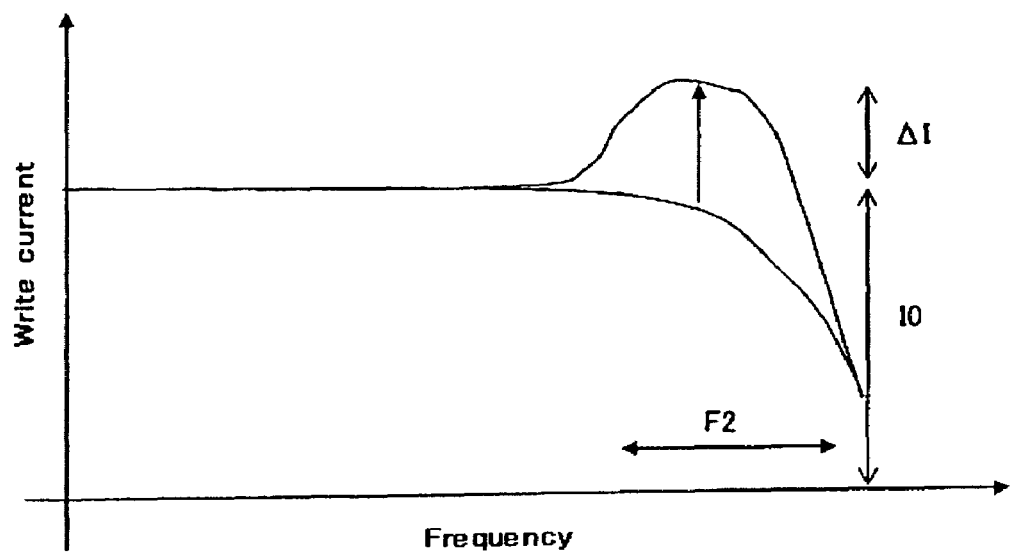
FIG. 7 is a schematic diagram for explaining the second example of amplifying the write current in the in-plane recording system.

In FIG. 6, the write current falls below I0 in a high frequency range F2. If the specified operating frequency range is from f1 to f3 including the high frequency range F2, the write current is amplified in the frequency range F2 until it reaches to the current value I0. This allows the write head to generate a sufficiently high magnetic field over the specified operating frequency range. As shown in FIG. 7, by amplifying the write current to a current value higher than I0, it is also possible to improve the overwrite characteristics in the high frequency range F2. In addition, during the manufacturing processes, it is possible to detect a frequency range in which the write current value is lower than I0 and amplify the write current value in the frequency range to a sufficient value. Further, it is also possible to increase the amplification of a specific frequency range in which the overwrite characteristics deteriorates, as shown in FIGS. 4 and 5. As shown in FIGS. 6 and 7, the write current is not amplified in the low frequency range when the write current value is I0 which meets the specification. Thus, it is possible to minimize influences due to the ATI without excessively increasing the write current.

Figure 8:
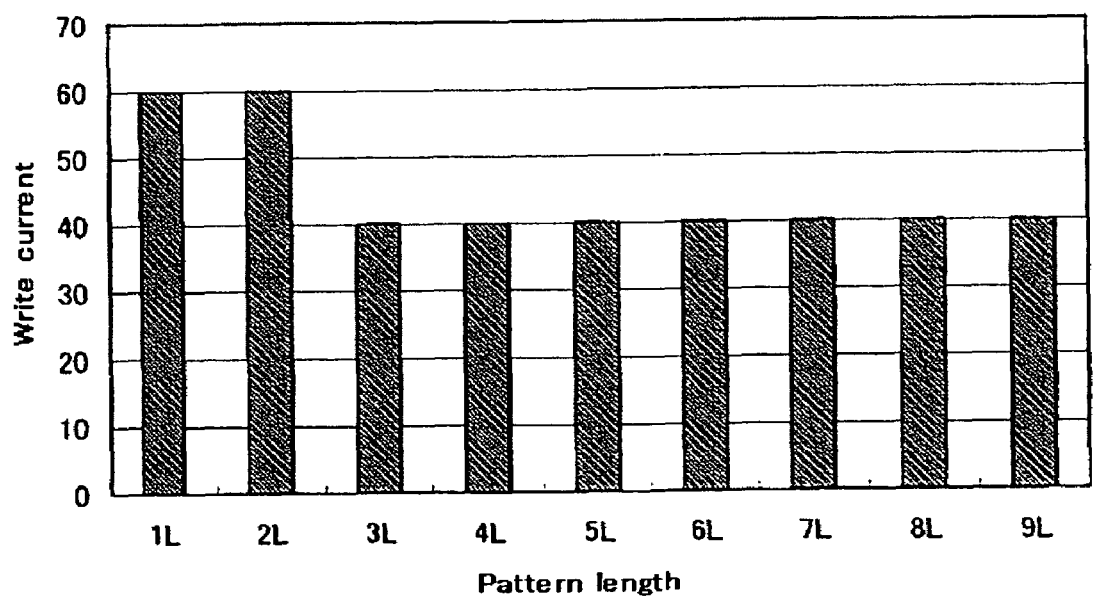
FIG. 8 shows the relationship between the write current and recorded pattern lengths in the in-plane recording system.

In FIG. 8, the above-mentioned amplification of the write current is illustrated in terms of the write patterns. FIG. 8 shows how the write current is dependent on each write pattern length. In the example of FIG. 8, the write patterns vary in length from the shortest pattern length 1L to the longest pattern length 9L. The recording frequency corresponds to the pattern length. The recording frequency increases as the pattern length shortens. The overwrite characteristics may be judged by, for example, overwriting the 9L patterns that are first written with 1L patterns. Since overwriting with short patterns such as 1L and 2L patterns are generally disadvantageous in terms of the overwrite characteristics. In the present embodiment, the write current value is set to 60 mA only when the recording frequency range to record 1L and 2L patterns is used. At the other frequencies, the write current value is set to 40 mA. According to the above-mentioned scheme, the minimum write current value I0 is 40 mA, and the current increase ΔI is 20 mA.

If the write current in the high frequency range decreases as shown in FIG. 6, the write current targeted for amplification is set to 60 mA for the frequency range to record 3L and longer patterns, and set to a value higher than 60 mA for the frequency range to record 1L and 2L patterns. It is apparent that the write current may be set to 60 mA only at the frequency to record data with a 1L pattern length, which deteriorates the overwrite characteristics.

The relationship between the write current and NLTS (Non-Linear Transition Shift) will be described. The NLTS is a nonlinear shift of the location of the subsequent transition mainly due to the demagnetizing field from the preceding transition. The NLTS is reduced as the write current value in the high frequency range decreases as shown in FIG. 6. To provide the substantially same write compensation in the high frequency range as in the low frequency range, the write current must be increased in the high frequency range so as to make the NTLS uniform over the whole frequency range.

Figure 9:
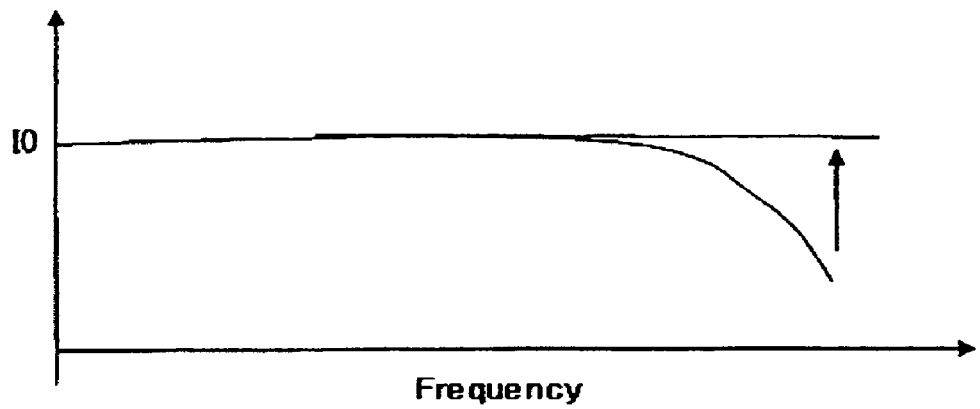
FIG. 9 is a graph showing a first specific example of a write current supply section according to an embodiment of the present invention.
Figure 10:
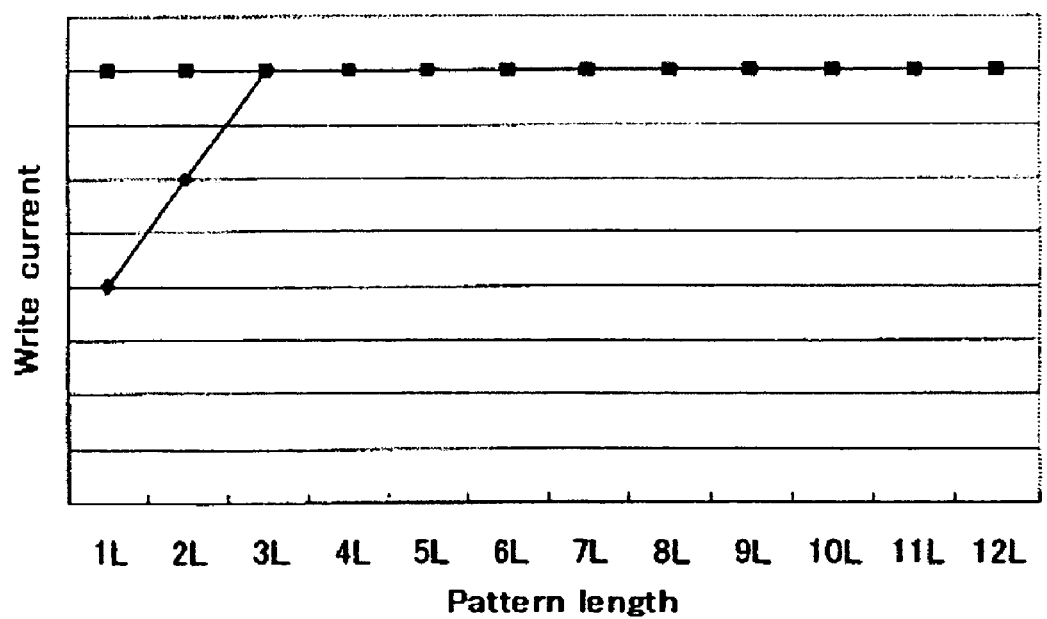
FIG. 10 is a graph showing a second specific example of the write current supply section according to an embodiment of the present invention.

That is, if the write current in the high frequency range or the write current to record data with a short pattern length decreases for some reason as shown in FIG. 9 or FIG. 10, the NLTS is even over the entire frequency range by amplifying the write current value to I0 which meets the specification, which can obtain the accurate write compensation.

Figure 11:
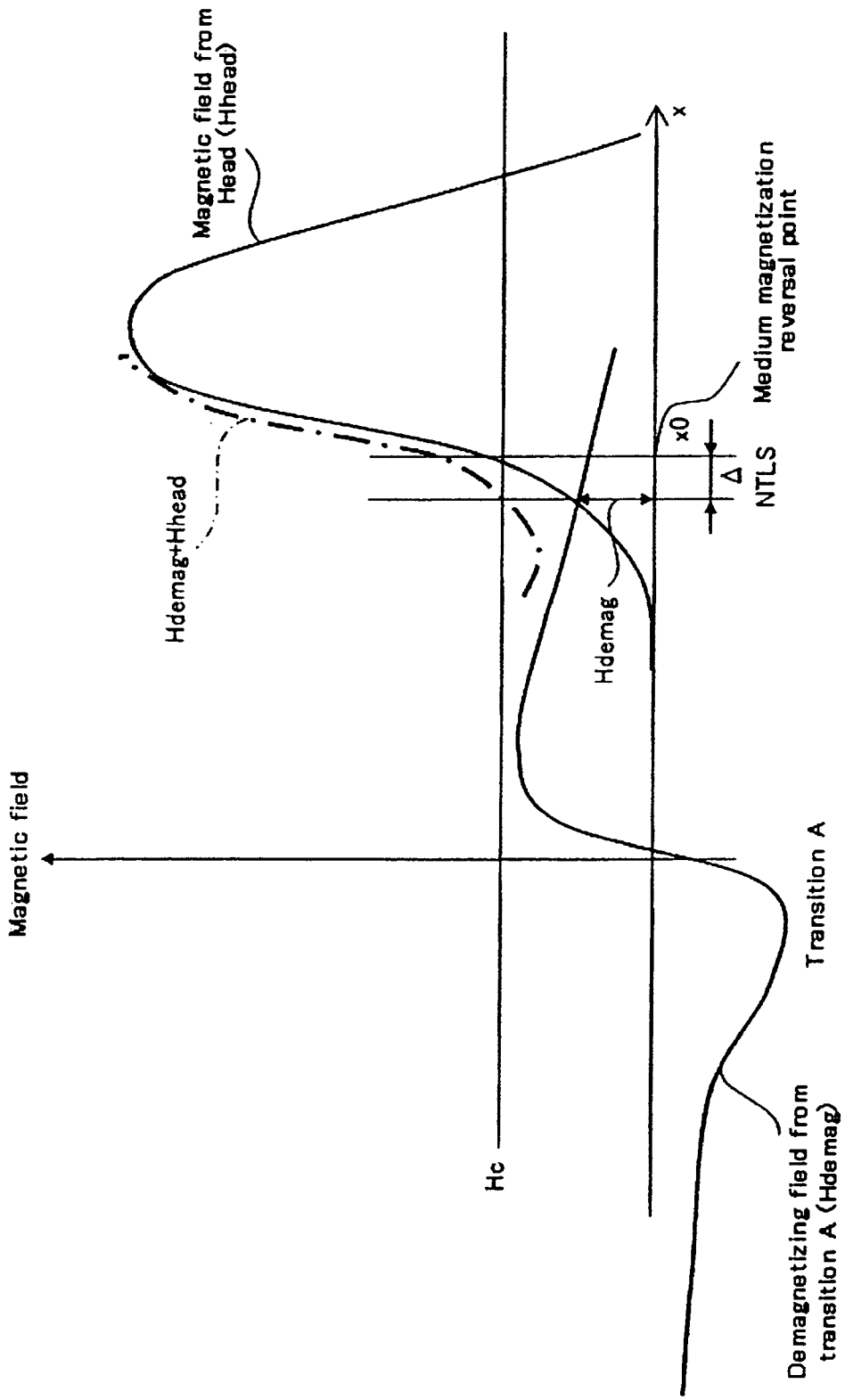
FIG. 11 is a graph showing a third specific example of the write current supply section according to an embodiment of the present invention.
Figure 12A:
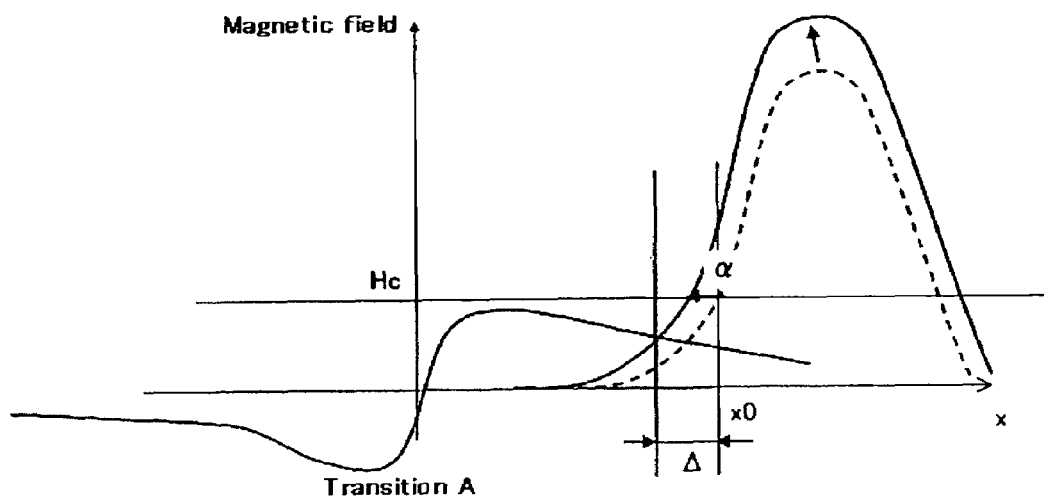
FIGS. 12(a)-(b) are graphs showing examples of how the write current is amplified in the perpendicular recording system.
Figure 12B:
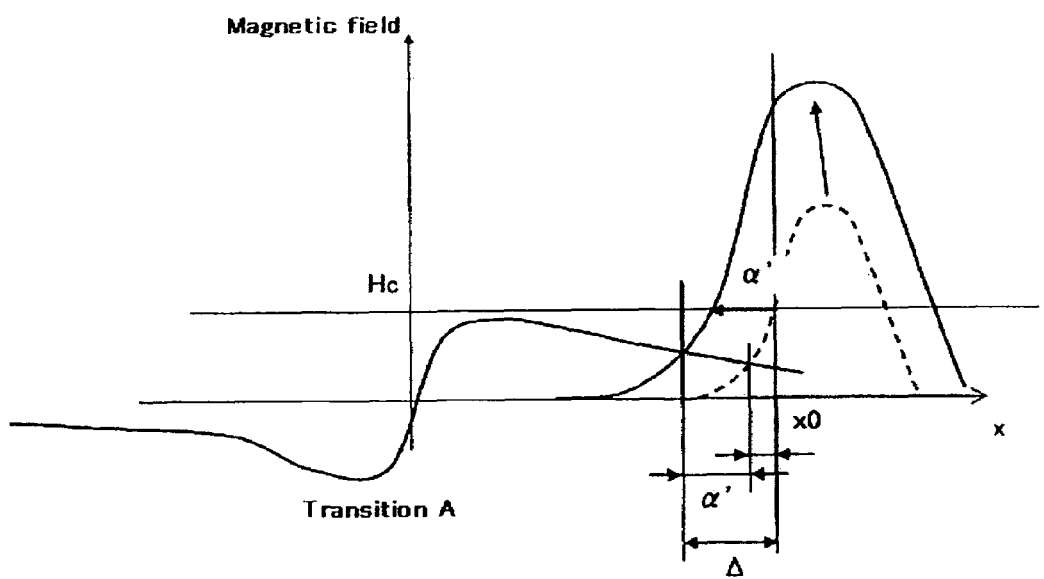

The reason for the decrease of the NLTS will be described below. FIG. 11 is a graph for explaining the NLTS. FIG. 12(a) is a graph showing the case where the NTLS decreases if the write current is excessively large, and FIG. 12(b) is a graph showing the case where the NTLS is adjusted by amplifying the write current. In FIGS. 11 and 12, the horizontal axis represents the direction in which the signal is written, while the vertical axis represents the magnitude of the magnetic field in the medium.

To write a transition at a position x0, for example, a magnetic field from the head Hhead (x) is generated from the write head. Its profile (value) reaches the magnetic field Hc which is required to produce a transition just at the position x0. In the medium, a demagnetizing magnetic field Hdemag (x) exists which comes from the nearest transition A. Hdemag (x) acts in the direction to facilitate writing of the transition at the position x0 as the position x0 is closer to the transition A. That is, Hhead(x) and Hdemag(x) exist in the medium and transition x0 shifts toward the transition A by the NLTS Δ.

The NLTS Δ is nearly equal to $H\text{demag}(x0)/(dH\text{head}(x0)/dx|x=x0)$

That is, the transition is written earlier, a period of time corresponding to the NLTS Δ. As described above, the NLTS is a phenomenon where the transition is written at the position that nonlinearly shifts by the NLTS Δ from the position x0 when an attempt of writing the transition at the position x0 is performed.

If a larger magnetic field is generated from the write head without changing the peak position of the magnetic field Hhead, the NLTS Δ increases by about α as shown in FIG. 12(a). On the other hand, for example, if the frequency characteristic of the AE is poor, the NLTS Δ decreases since the Hhead value (broken line in FIG. 12(b)) is smaller than the normal value. Therefore, it is possible that the NLTS may become negative, that is, the transition may be written later than x0. In this case, as shown in FIG. 12(b), the write current may be increased in the high frequency range so as to increase the NLST by α'. As a result, the NLTS Δ becomes the substantially same value as that in the low frequency range. This makes it possible to keep the NLTS uniform over the whole frequency range.

That is, the write current in the high frequency range is increased, it is possible to improve the overwrite characteristics while minimizing influences due to the ATI Further, it is possible to recover the write current value when the write current value is reduced to a value at which the specified amplitude in the high frequency range is not satisfied. This can prevent the NLTS value in the high frequency range from being small to maintain the substantially same NLTS as in the low frequency range, resulting in obtaining accurate write compensation.

Figure 13:
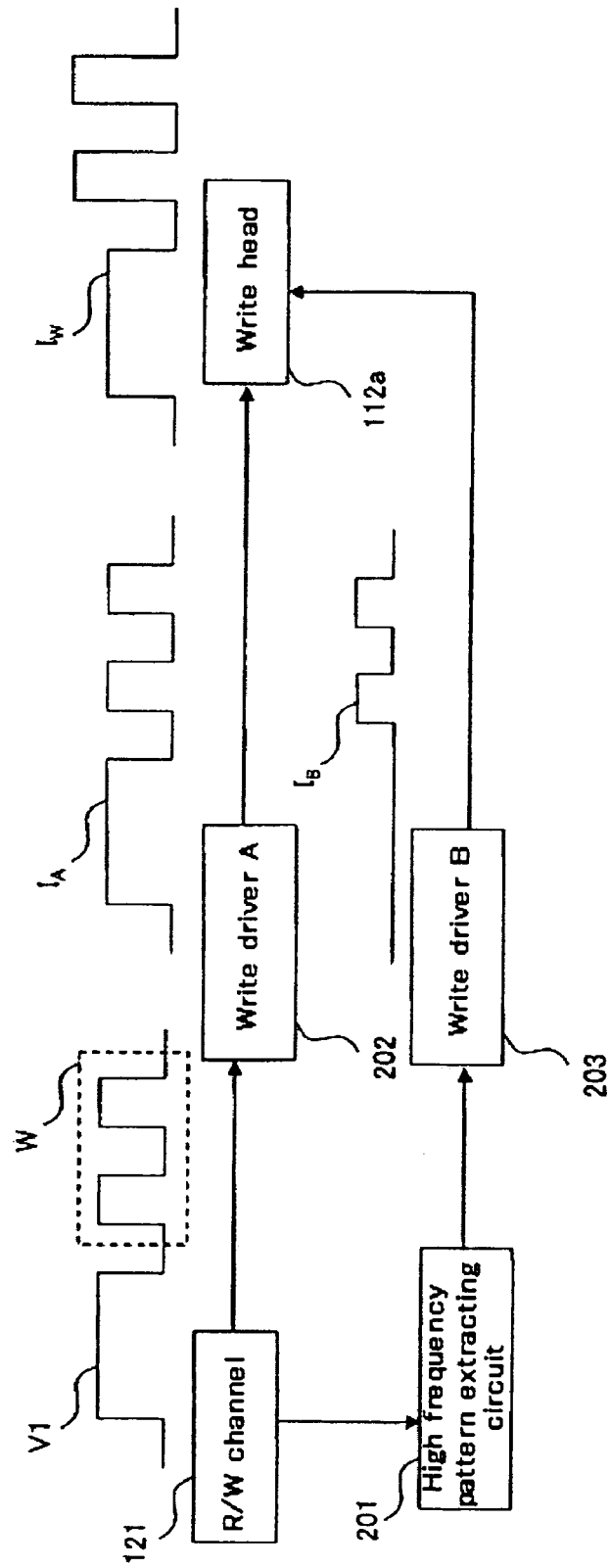
FIG. 13 is a schematic diagram for explaining the example of amplifying the write current in the perpendicular recording system.

The following provides a detailed description of a circuit configuration to amplify the write current in the specific high frequency range as mentioned above. FIG. 13 shows a first specific example of a write current supply section in the present embodiment. As shown in FIG. 13, the AE 113 in example 1 has a write driver A 202 and a write driver B 203.

The write driver A 202 is a common write driver which generates a write current $I_A$ with a current value of I0 and supplies it to the write head 112a. The polarity of the write current $I_A$ changes based on the binary write signal V1 sent from the R/W channel 121. In addition, In this specific example, a high frequency pattern extracting circuit 201 is provided as a circuit for extracting specific-frequency signals. The high frequency extracting circuit 201 detects and extracts high frequency patterns from the write signal V1. For example, the high frequency extracting circuit 201 detects a write signal which corresponds to 1L and 2L patterns (high frequency patterns), extracts a part of the write signal through a window W, and supplies it to the write driver B 203. From the extracted high frequency patterns, the write driver B 203 generates a write current $I_B$ including a current increase $\Delta I$ (see FIG. 5) to exclusively amplify the high frequency patterns.

The write current from the write driver A 202 and the write current from the write driver B 203 are supplied to the write head 112a of the magnetic head 112. Data is written to the disk by adding a write current $I_W$ to both of the write currents. The value of the write current $I_W$ is I0+$\Delta$I when 1L and 2L patterns are recorded, and is I0 when other patterns are recorded. Alternatively, the output of the write driver B 203 may be supplied to the write driver A 202 to add the write currents $I_A$ and $I_B$ thereto. It may be possible to provide a separate adder which generates the write current while controlling the timing of generating the write current. In the first specific example, the write channel of the R/W channel 121, the high frequency pattern extracting circuit 201, the write driver A 202 and the write driver B 203 constitutes a write current supply section which generates the write signal V1 to be recorded to the disk and generates the write current $I_W$ at a frequency corresponding to a data length to be recorded to the disk based on the write signal V1.

According to this specific example, the high frequency pattern extracting circuit 201 detects a frequency range in which the write current is to be amplified. The write driver B 203 separately generates the current $I_B$ for amplification and adds the current $I_B$ to the current $I_A$, making it possible to generate the write current in which the write current value at the specific frequency range is amplified.

Figure 14:
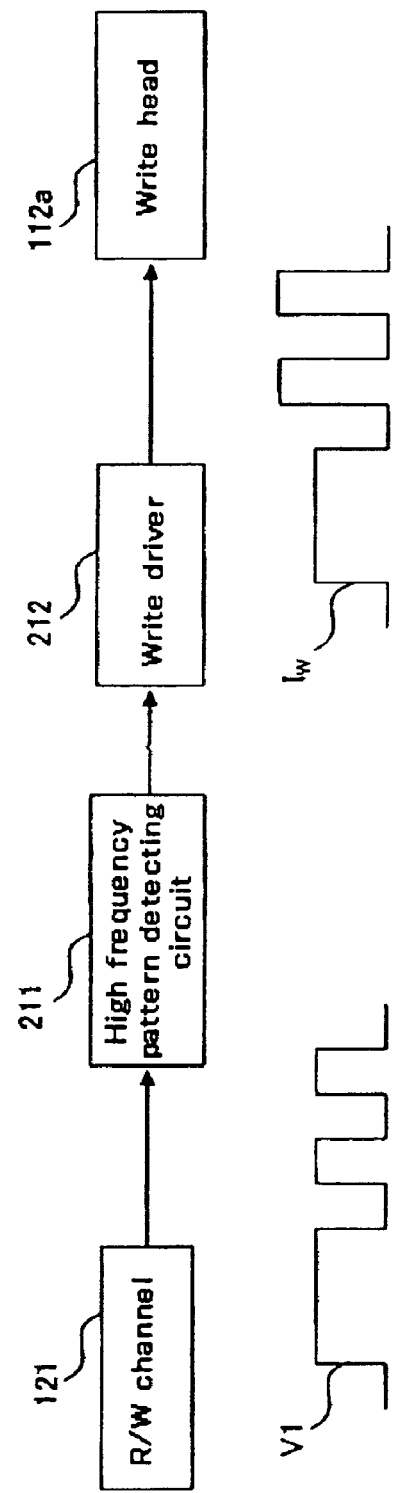
FIG. 14 shows the relationship between the write current and the recorded pattern length in the perpendicular recording system.

Another specific example is described below. FIG. 14 shows a second specific example of the write current supply section in the present embodiment. In the second example as shown in FIG. 14, a high frequency pattern detecting circuit 211 is provided between the R/W channel 121 and the write driver 212, and is used as a circuit for detecting a specific frequency range. The high frequency pattern detecting circuit 211 detects 1L and 2L patterns from the write signal V1 generated by the R/W channel 121. The high frequency pattern detecting circuit 211 supplies the timing at which a 1L or 2L pattern was detected, as well as the write signal V1. When the write driver 212 generates a write current with a value of I0 of which the polarity is determined according to the value of the binary write signal V1, it increases the write current to I0+$\Delta$I if the 1L/2L pattern detection timing is supplied. Thus, the write current $I_W$ which is output from the write driver 212 is amplified to I0+$\Delta$I from the normal value I0 when 1L and 2L patterns are recorded.

Figure 15:
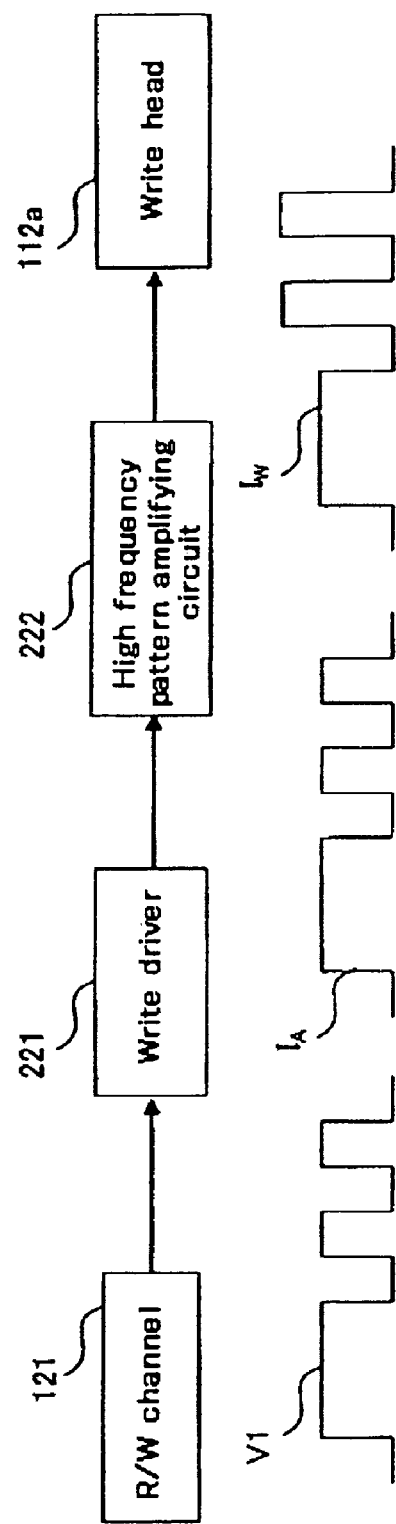
FIG. 15 is a schematic diagram showing a third specific example of the write current supply section according to an embodiment of the present invention.

FIG. 15 shows a third specific example of the write current supply section in the present embodiment. As shown in FIG. 15, the third example has a high frequency pattern amplifying circuit 222 provided between the write driver 221 and the write head 112a as a circuit for amplifying a specific frequency range. The write driver 221 generates a write current $I_A$ with a value of I0 and with a polarity switched according to the write signal generated by the R/W channel 121 in the same manner as the write driver A 203 shown in FIG. 13.

The write current $I_A$ generated by the write driver 221 is amplified to I0+$\Delta$I by the high frequency pattern amplifying circuit 222 only when the high frequency 1L and 2L patterns are recorded. The write current I3 output from this high frequency pattern amplifying circuit 222 is supplied to the write head 112a to write data to the disk.

Thus, the write current is generated from the write signal V1 output from the R/W channel 121. Detecting high frequency patterns and amplifying the write current for the high frequency patterns may be performed either when or after the write current is generated.

In the in-plane recording system according to the present embodiment, it is possible to improve the overwrite characteristics by amplifying the write current in the high frequency range to record the 1L and 2L patterns which may deteriorate the overwrite characteristics. This also improves reliability of the disk drive since a reliable write current flowing in the write head can be ensured and the write head can generate a sufficiently high magnetic field for recording even when the frequency is in such a high frequency range which causes the effective write current to be reduced. Further, since the write current is amplified only in the specific high frequency range and not amplified in the low frequency range to record relatively long pattern lengths in which the overwrite characteristics are normally obtained, it is possible to suppress influences due to the ATI as compared with the system where the write current is amplified over the whole frequency range.

For the present embodiment, the above description has been made by using the in-plane recording HDD as an example. Using the perpendicular recording system, it is also possible to improve the overwrite characteristics by amplifying the write current in a specific frequency range.

In the perpendicular magnetic recording system, magnetization in a direction perpendicular to the disk surface is overwritten. Contrary to the in-plane recording system, the perpendicular magnetic recording system can provide more stable residual magnetization as the recording density is higher since the magnetic layer on the disk is perpendicularly magnetized. That is, since the overwrite characteristics decreases when long pattern lengths are recorded, the write current in a low frequency range is amplified. The write current tends to decrease in a low frequency range. Since the write current is amplified to a specified level only in a low frequency range, it is possible to minimize influences due to the ATI without excessively amplifying the write current in the other frequency range.

Figure 16:
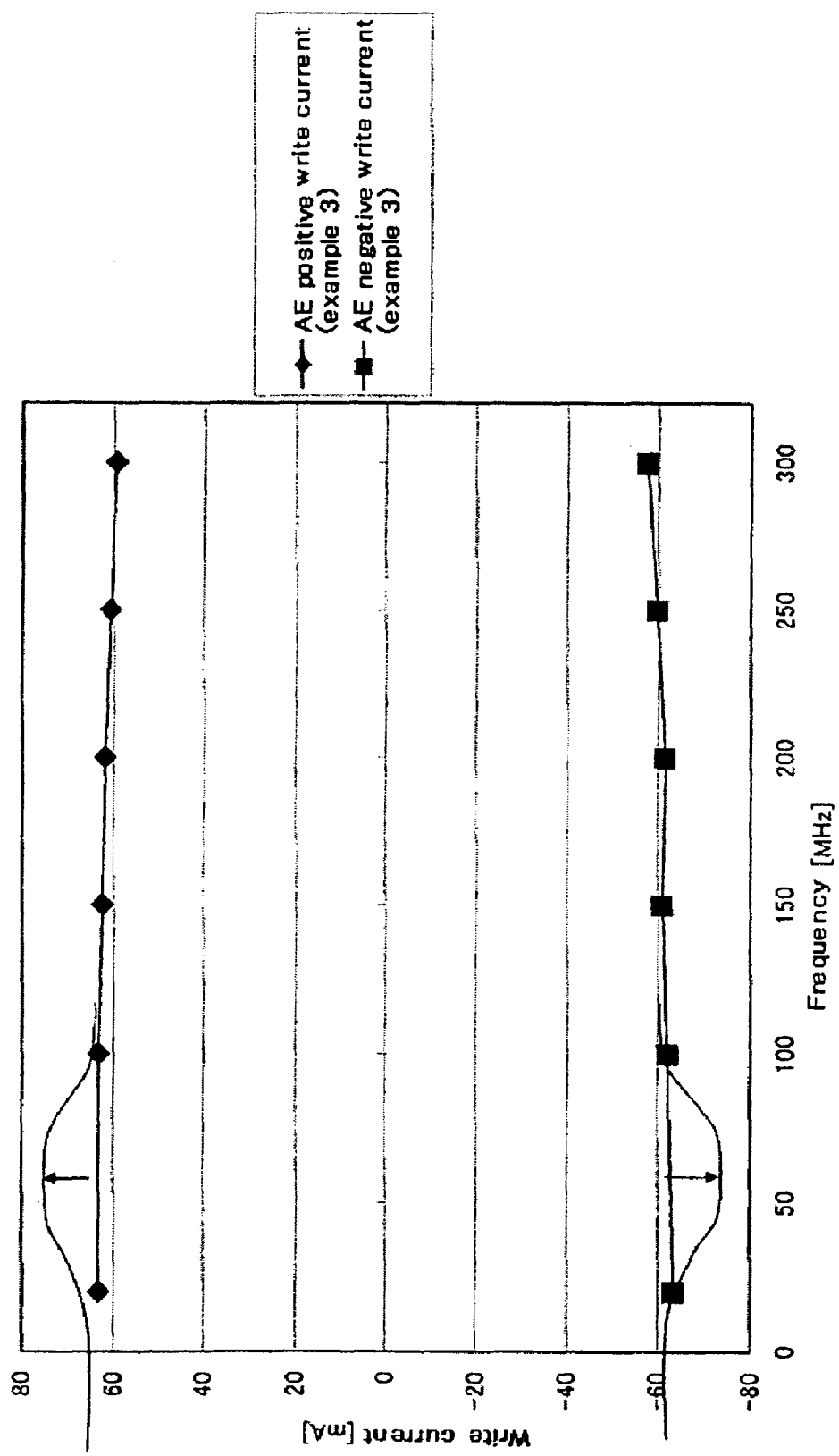
FIG. 16 is a graph showing an example of how the write current is amplified in the perpendicular recording system.
Figure 17:
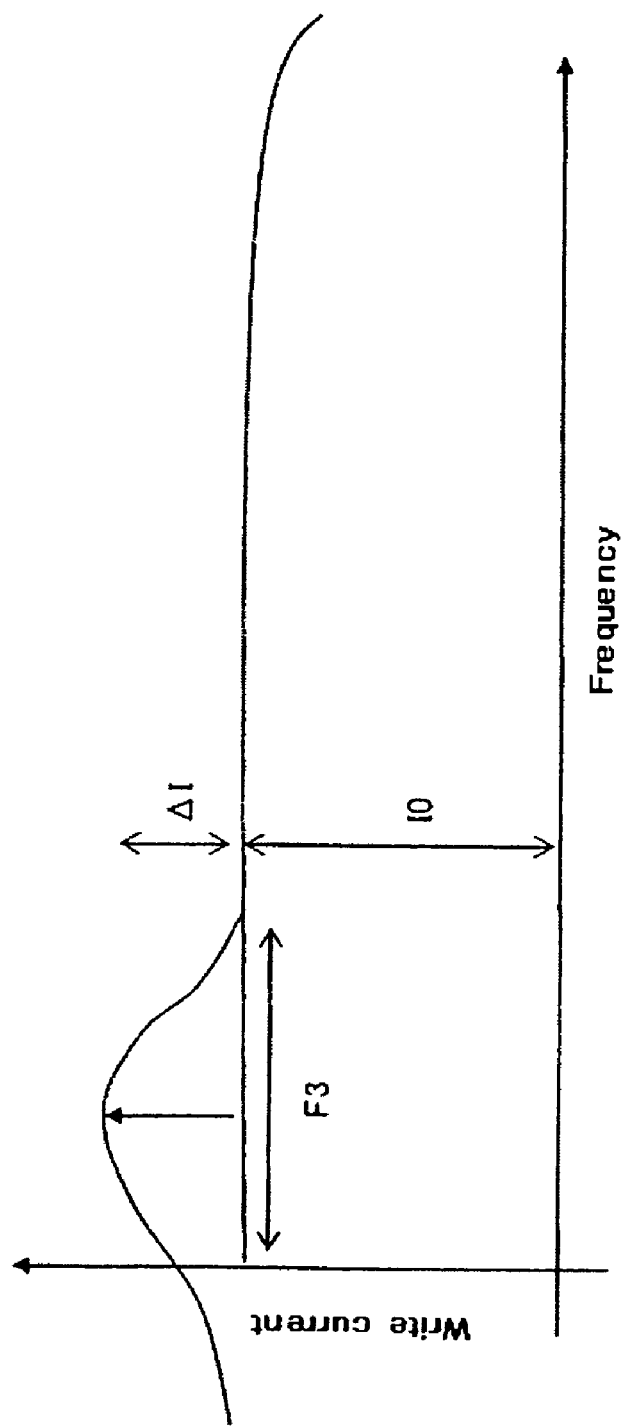
FIG. 17 is a graph for explaining the example of amplifying the write current in the perpendicular recording system.

FIGS. 16 and 17 are views for explaining how the write current is amplified in the perpendicular recording system. As shown in FIG. 16, the write current is amplified when the frequency is in a low frequency range of, for example, 20 to 100 MHz if the specified frequency range is from 2 to 300 MHz. As shown in FIG. 17, the write current is amplified from I0 to I0+$\Delta$I only when the frequency is in a low frequency rage F3. Where, I0 is the minimum write current required by the write head to generate a magnetic field enough high to cause sufficiently saturated magnetization in the magnetic layer.

Figure 18:
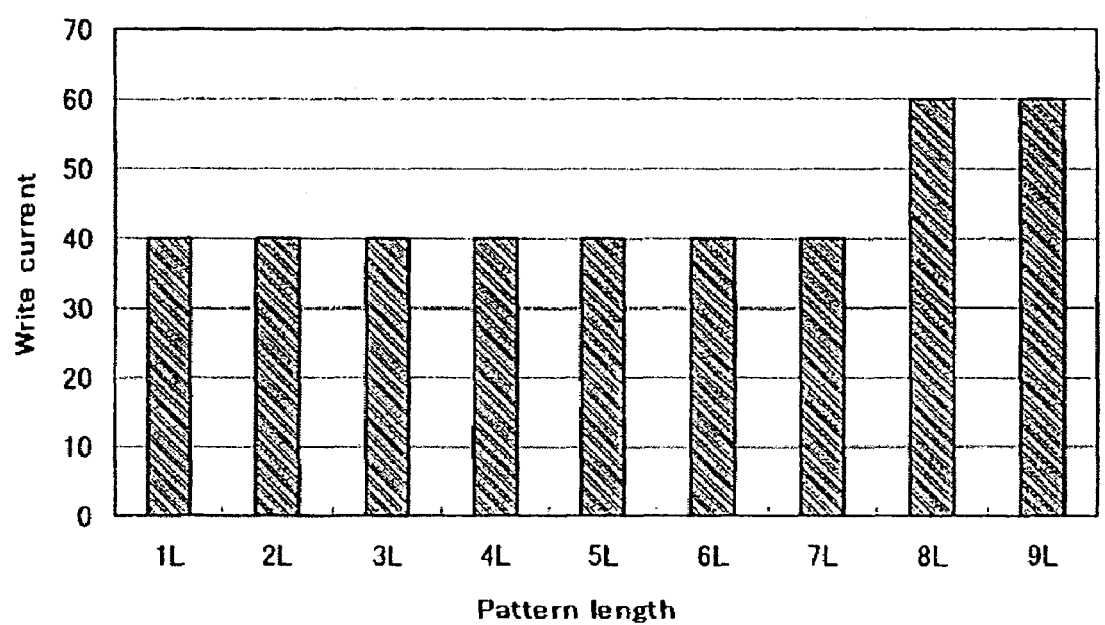
FIG. 18 is a graph showing the relationship between the write current and pattern lengths in the perpendicular recording system.

FIG. 18 shows the relationship between the write current and the pattern length in the perpendicular recording system. Like the in-plane recording system, the frequency of the write current decreases as the pattern length becomes larger. In the perpendicular recording system, the overwrite characteristics tends to deteriorate when 9L and 8L patterns are recorded. Accordingly, the write current is amplified when the frequency is in a low frequency range corresponding to 9L and 8L patterns. It is assumed that this low frequency range is, for example, the 20 to 100 MHz range in FIG. 16 or the frequency range F3 in FIG. 17. The write current is set to 60 mA only for these 9L and 8L patterns and set to 40 mA for 7L and the shorter patterns. This selective amplification can improve the overwrite characteristics while minimizing influences due to the ATI. Further, the write current may be amplified only for the longest 9L pattern.

In the perpendicular recording system, this selective amplification of the write current may be achieved by the same method as one of the above-mentioned first through third specific examples. For this purpose, the high frequency pattern extracting circuit 201 shown in FIG. 13 is modified to a low frequency pattern extracting circuit which detects and extracts low frequency patterns. Likewise, the high frequency pattern detecting circuit 211 shown in FIG. 14 is modified to a low frequency pattern detecting circuit which detects low frequency patterns. The high frequency pattern amplifying circuit shown in FIG. 15 is modified to a low frequency pattern amplifying circuit which amplifies the write current only when low frequency patterns are recorded.

It should be noted that the present invention is not limited to the specific embodiments mentioned above. Needless to say, various modifications may be made thereunto without departing from the spirit of the present invention. For example, the value of the write current may be amplified in incremental steps in a high frequency range in the in-plane recording system or in a low frequency range in the perpendicular recording system. In addition, although the HDDs using the in-plane recording system and using the perpendicular recording system are explained in the above-mentioned embodiments, the present invention is also applicable to disk drives which use other media such as magnetic optical disks.

What is claimed is:

1. A disk drive comprising:
a write current supply section for generating a write signal to be recorded to a disk and generating a write current according to the write signal; and
a write head for recording data to the disk based on the write current;
wherein the write current supply section generates the write current in a range of frequencies of the write signal that depend on data lengths, and the write current of which only the part in a specific frequency range that depends on the data lengths of the write signal is amplified is supplied to the write head.

2. A disk drive according to claim 1 wherein the write current supply section comprises:
a write channel for generating the write signal to be recorded to the disk;
a first write driver for generating a first write current based on the write signal generated by the write channel;
a specific frequency signal part extracting circuit for extracting a signal in the specific frequency range from the write signal generated by the write channel; and
a second write driver for generating a second write current based on the signal in the specific frequency range extracted by the specific frequency signal part extracting circuit;
wherein the write head records data to the disk based on the first write current and the second current.

3. A disk drive according to claim 1 wherein the write current supply section comprises:
a write channel for generating the write signal to be recorded to the disk;
a specific frequency signal part detecting circuit for detecting a signal in the specific frequency range from the write signal generated by the write channel; and
a write driver for generating the write current of which only the part in the specific frequency range of the write signal is amplified based on the write signal and a result detected by the specific frequency signal part detecting circuit.

4. A disk drive according to claim 1 wherein the write current supply section comprises:
a write channel for generating the write signal to be recorded to the disk;
a write driver for generating a first write current based on the write signal generated by the write channel; and
a specific frequency signal part amplifying circuit for generating a second write current by amplifying the first write current only in the specific frequency range of the write signal generated by the write driver;
wherein the write head records data to the disk based on the second write current.

5. A disk drive according to any of claims 1 through 4 wherein
the specific frequency range includes frequencies to record data with the shortest data length to the disk.

6. A disk drive according to any of claims 1 through 4 wherein
the write current supply section amplifies the write current in a high frequency range within the frequencies.

7. A disk drive according to any of claims 1 through 4 wherein
the specific frequency range includes frequencies to record data with the longest data length to the disk.

8. A disk drive according to any of claims 1 through 4 wherein
the write current supply section amplifies the write current in a low frequency range within the frequencies.

9. A disk drive according to claim 1 wherein the write head is an in-plane recording write head.

10. A disk drive according to claim 1 wherein the write head is a perpendicular recording write head.

11. A disk drive comprising:
a write current supply section for generating a write signal to be recorded to a disk and generating a write current based on the write signal; and
a perpendicular recording write head for recording data to the disk based on the write current;
wherein the write current supply section generates the write current in a range of frequencies of the write signal that depend on data lengths, and the write current of which only the part in a low frequency range is amplified is supplied to the write head.

12. A disk drive according to claim 11 wherein the write current supply section comprises:
a write channel for generating the write signal to be recorded to the disk;
a first write driver for generating a first write current based on the write signal generated by the write channel;

a low frequency signal part extracting circuit for extracting a signal in the low frequency range from the write signal generated by the write channel; and a second write driver for generating a second write current based on the signal in the low frequency range extracted by the low frequency signal part extracting circuit;

wherein the perpendicular recording write head records data to the disk based on the first write current and the second current.

13. A disk drive according to claim 11 wherein the write current supply section comprises:

a write channel for generating the write signal to be recorded to the disk;

a low frequency signal part detecting circuit for detecting a signal in the low frequency range from the write signal generated by the write channel; and a write driver for generating the write current of which only the part in the low frequency range is amplified based on the write signal and a result detected by the low frequency signal part detecting circuit.

14. A disk drive according to claim 11 wherein the write current supply section comprises:

a write channel for generating the write signal to be recorded to the disk;

a write driver for generating a first write current based on the write signal generated by the write channel; and a low frequency signal part amplifying circuit for generating a second write current by amplifying the first write current only in a specific frequency range generated by the write driver;

wherein the perpendicular recording write head records data to the disk based on the second write current.

15. A control method for a disk drive comprising:

a write current supply section for generating a write signal to be recorded to a disk and generating a write current based on the write signal; and a write head for recording data to the disk based on the write current; the control method comprising the steps of:

generating the write current of which only the part in a specific frequency range of the write signal is amplified; and making the write head record data to the disk based on the write current.

16. A control method for a disk drive according to claim 15, comprising the steps of:

generating the write signal to be recorded to the disk;

generating a first write current based on the write signal;

extracting a signal in the specific frequency range from the write signal;

generating a second write current based on the extracted signal in the specific frequency range; and making the write head record data to the disk based on the first write current and the second write current.

17. A control method for a disk drive according to claim 15, wherein the write current of which only the part in the specific frequency range of the write signal is amplified is generated by the steps of:

generating the write signal to be recorded to the disk;

detecting a signal in the specific frequency range from the write signal generated by the write channel; and generating the write current of which only the part in the specific frequency range of the write signal is amplified based on the write current and the a result detected in the detecting step.

18. A disk drive control method according to claim 15, comprising the steps of:

generating the write signal to be recorded to the disk;

generating a first write current based on the write signal;

generating a second current by amplifying the first current only in the specific frequency range; and making the write head record data to the disk based on the second write current.

* * * * *